(12) United States Patent
Jakob et al.

(10) Patent No.: US 11,242,881 B2
(45) Date of Patent: Feb. 8, 2022

(54) SCREW FOR CUTTING A THREAD

(71) Applicant: Arnold Umformtechnik GmbH & Co. KG, Forchtenberg-Ernsbach (DE)

(72) Inventors: Thomas Jakob, Ahnatal (DE); Bernd Werthwein, Forchtenberg-Sindringen (DE)

(73) Assignee: Arnold Umformtechnik GMBH & Co. KG, Forchtenberg-Ernsbach (DE)

( * ) Notice: Subject to any disclaimer, the term of this patent is extended or adjusted under 35 U.S.C. 154(b) by 575 days.

(21) Appl. No.: 16/096,790

(22) PCT Filed: Apr. 27, 2017

(86) PCT No.: PCT/EP2017/060031
§ 371 (c)(1),
(2) Date: Oct. 26, 2018

(87) PCT Pub. No.: WO2017/186838
PCT Pub. Date: Nov. 2, 2017

(65) Prior Publication Data
US 2021/0222720 A1    Jul. 22, 2021

(30) Foreign Application Priority Data
Apr. 29, 2016   (DE) .......................... 202016002905.4

(51) Int. Cl.
*F16B 25/00* (2006.01)
*F16B 33/02* (2006.01)

(52) U.S. Cl.
CPC ...... *F16B 25/0047* (2013.01); *F16B 25/0078* (2013.01); *F16B 25/00* (2013.01); *F16B 25/0084* (2013.01); *F16B 33/02* (2013.01)

(58) Field of Classification Search
CPC .... F16B 5/0275; F16B 25/00; F16B 25/0047; F16B 25/0057; F16B 25/0068;
(Continued)

(56) References Cited

U.S. PATENT DOCUMENTS

| 2,293,930 A | 8/1942 | Braendel |
| 3,180,126 A * | 4/1965 | Carlson .................. B21H 3/027 72/365.2 |

(Continued)

FOREIGN PATENT DOCUMENTS

| CN | 2553163 | 5/2003 |
| CN | 104100623 | 10/2014 |

(Continued)

OTHER PUBLICATIONS

English translation of Chinese Office Action for Chinese App. No. 201780026641.6 dated Feb. 15, 2020; 8 pages.

*Primary Examiner* — Roberta S Delisle
(74) *Attorney, Agent, or Firm* — Boyle Fredrickson, S.C.

(57) ABSTRACT

The invention relates to a screw for cutting a thread into a component, having a shank which at least in portions is provided with a thread, a screw head having a drive configuration, the latter being adjoined by the shank, wherein, proceeding from an end of the shank that is opposite the head, first a cutting portion and then a holding portion are disposed, wherein the cutting portion and the holding portion are provided with a thread, wherein the holding portion has a larger external diameter in relation to the cutting portion, characterized in that a truncated-cone-type intermediate portion that is provided with a thread is disposed between the holding portion and the cutting portion, and in that the cutting portion has a truncated-cone-type attachment portion.

13 Claims, 2 Drawing Sheets

(58) Field of Classification Search
CPC .. F16B 25/0078; F16B 25/0084; F16B 33/02; F16B 35/041; F16B 35/065
USPC ................................ 411/411, 412, 424, 426
See application file for complete search history.

(56) References Cited

U.S. PATENT DOCUMENTS

| | | | |
|---|---|---|---|
| 3,918,345 A | 11/1975 | Phipard, Jr. | |
| 3,939,512 A * | 2/1976 | Thurston | F16B 25/0047 470/10 |
| 4,486,135 A * | 12/1984 | Kazino | F16B 25/0078 411/411 |
| 5,842,923 A * | 12/1998 | Umemura | F16B 25/0047 470/10 |
| 5,882,162 A * | 3/1999 | Kaneko | F16B 25/0078 411/411 |
| 6,089,806 A * | 7/2000 | Reynolds | B21K 1/46 411/386 |
| 8,192,123 B2 * | 6/2012 | Ernst | F16B 25/0026 411/387.1 |
| 8,939,692 B2 * | 1/2015 | Werthwein | F16B 25/0078 411/386 |
| 9,157,467 B2 * | 10/2015 | Ambros | F16B 25/0078 |
| 2008/0226424 A1 * | 9/2008 | Matthiesen | F16B 25/0047 411/411 |
| 2010/0014938 A1 * | 1/2010 | Sussenbach | F16B 39/30 411/309 |

FOREIGN PATENT DOCUMENTS

| | | |
|---|---|---|
| DE | 2706246 | 9/1977 |
| DE | 2853976 | 6/1980 |
| DE | 102010000702 | 7/2011 |
| DE | 102011118587 | 5/2013 |
| DE | 102013210527 | 12/2014 |
| EP | 0012441 | 6/1980 |
| GB | 1022355 A | 8/1962 |
| WO | 2008156425 | 12/2008 |

* cited by examiner

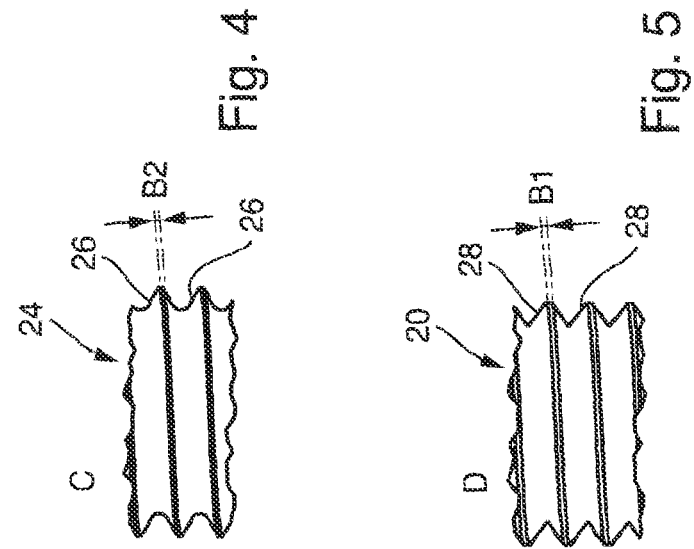
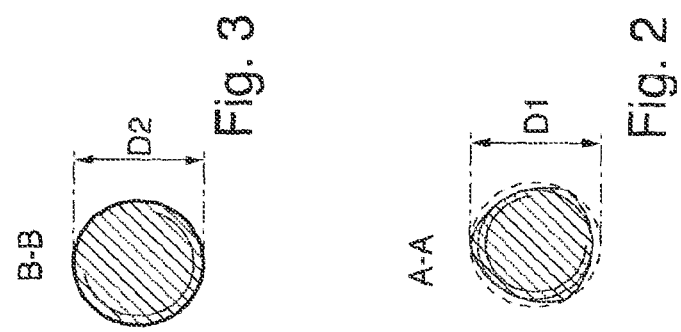
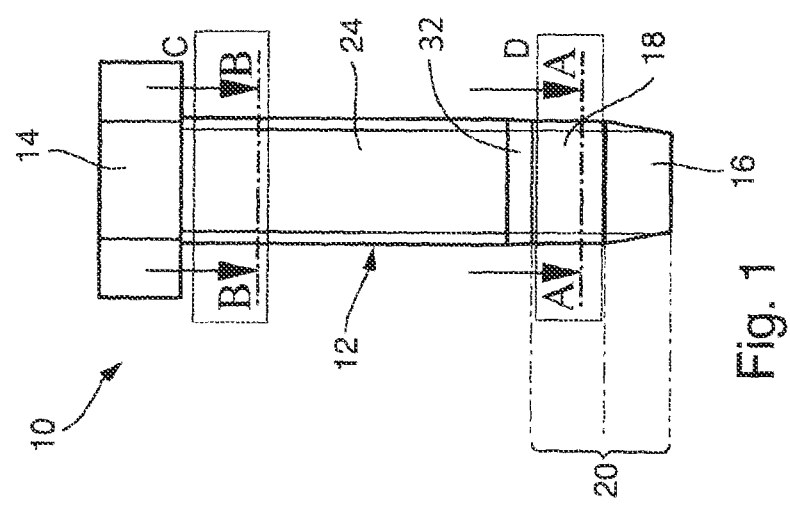

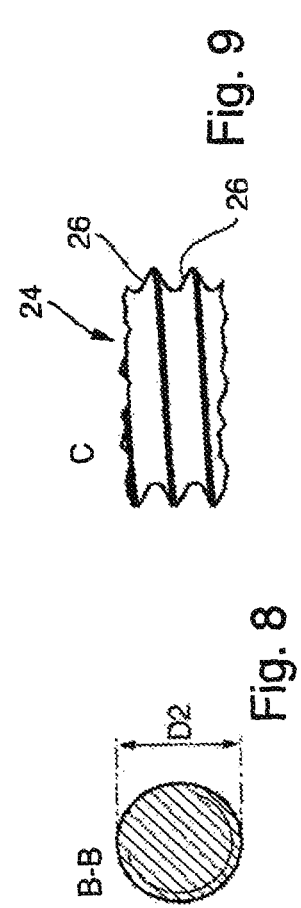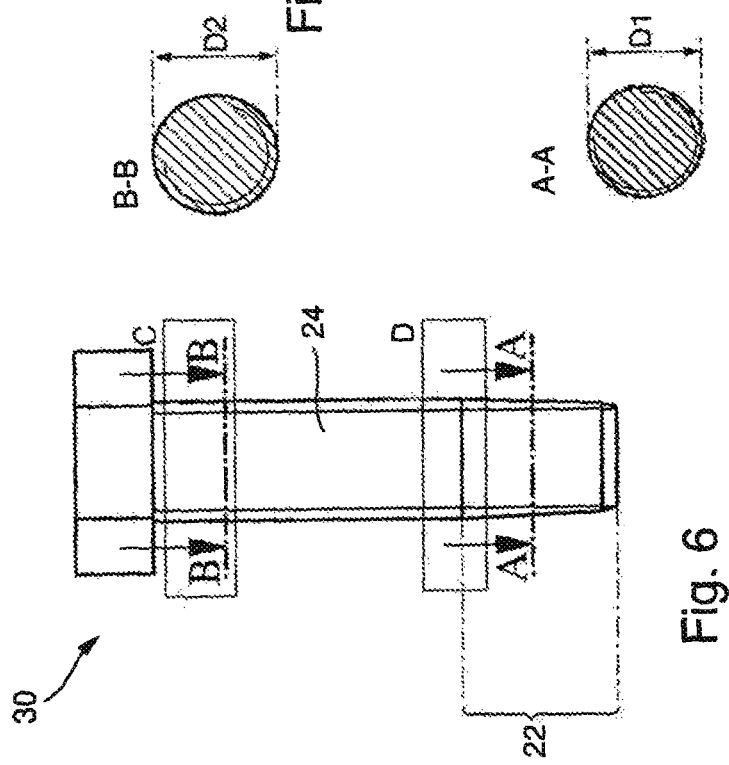

SCREW FOR CUTTING A THREAD

BACKGROUND

Field of the Application

The invention relates to a screw for cutting a thread into a component, having a shank which at least in portions is provided with a thread, a screw head having a drive configuration, the latter being adjoined by the shank, wherein, proceeding from an end of the shank that is opposite the head, first a cutting portion and then a holding portion are disposed, wherein the cutting portion and the holding portion are provided with a thread.

SUMMARY

The intention is to improve a screw for cutting a thread in terms of the loading capacity of said screw by way of the invention.

To this end, according to the invention a screw having the features of claim 1 is provided. Advantageous refinements of the invention are stated in the dependent claims. What is proposed is a screw for cutting a thread into a component, having a shank which at least in portions is provided with a thread, and a screw head having a drive configuration, the latter being adjoined by the shank, wherein, proceeding from an end of the shank that is opposite the head, first a cutting portion and then a holding portion are disposed, wherein the cutting portion and the holding portion are provided with the thread, and wherein the holding portion has a larger external diameter in relation to the cutting portion.

An improved engagement of the holding portion in the thread cut into the component is achieved in that the holding portion has a larger external diameter in relation to the cutting portion. On account thereof, the loading capacity of the screw is improved, and it can in particular be avoided that the cut thread is torn out when the screw is tightened.

In a refinement of the invention the holding portion has a round cross section.

In this way, the holding portion can be adapted in an optimal manner to the cut thread, and an increase in the loading capacity can be achieved on account thereof.

In a refinement of the invention the cutting portion has a polygonal cross section having rounded corners and convexly curved lateral edges, in particular a polylobular cross section.

The cutting of the thread by means of such a cross section in the cutting portion can be improved in relation to a round cross section.

In a refinement of the invention a height of the thread flanks, measured in the radial direction, in the holding portion is larger than in the cutting portion.

A loading capacity of the screw in the holding portion can also be increased by way of a greater height of the thread flanks in the holding portion in relation to the cutting portion.

In a refinement of the invention a width of the thread flanks, measured parallel with a central longitudinal axis of the shank, in the cutting portion, at least at the base of the thread flanks, is larger than in the holding portion.

A wide base ensures stable thread flanks which are required when cutting the thread. By contrast, an ideally well adapted engagement of the thread flanks in the cut thread is desirable in the holding portion in order for the loading capacity to be increased. The thread flanks that are narrower at the base thereof in the holding portion serve this purpose in this instance.

In a refinement of the invention, the width of the thread flanks at the radially outward end thereof in the cutting portion is larger than in the holding portion.

According to the invention, the radially outward end of the thread flanks in the cutting portion is also wider than in the holding portion. Stable thread flanks are required in the cutting portion in order for a thread to be able to be cut. By contrast, the focus in the holding portion is on an optimal engagement of the thread flanks in the cut thread, in order for the loading capacity to be increased.

In a refinement of the invention the holding portion is configured so as to be cylindrical.

In the refinement of the invention a truncated-cone-type intermediate portion that is provided with a thread is disposed between the holding portion and the cutting portion.

In a refinement of the invention the cutting portion has a truncated-cone-type attachment portion and can additionally have a cylindrical calibration portion.

According to one alternative design embodiment of the invention, the cutting portion overall is configured in the manner of a truncated cone. The truncated-cone-type intermediate portion in this instance can seamlessly transition into the cutting portion.

In a refinement of the invention a transition between the thread flanks of two neighboring thread turns in the holding portion is convexly rounded.

An improved engagement in the thread turns of the cut thread is achieved in this way.

In a refinement of the invention a transition between the thread flanks of two neighboring thread turns in the cutting portion is configured so as to be V-shaped.

A V-shaped transition between the thread flanks in the cutting portion serves for implementing thread flanks at the base which, when viewed in the longitudinal direction of the shank, are wide and thus stable. On account thereof, the load-bearing capability of the thread flanks is greater in the cutting portion such that the cutting of the thread is facilitated or improved, respectively.

BRIEF DESCRIPTION OF THE DRAWINGS

Further features and advantages of the invention are derived from the claims and the description hereunder of preferred embodiments of the invention in conjunction with the drawings. Individual features of the various embodiments illustrated and described herein can be combined with one another in an arbitrary manner without exceeding the scope of the invention. In the drawings:

FIG. 1 shows a schematic lateral view of a screw according to the invention and according to a first embodiment;

FIG. 2 shows a view onto the section plane A-A in FIG. 1;

FIG. 3 shows a view onto the section plane B-B in FIG. 1;

FIG. 4 shows an enlarged illustration of the detail C in FIG. 1;

FIG. 5 shows an enlarged illustration of the detail D in FIG. 1;

FIG. 6 shows a schematic lateral view of a screw according to the invention and according to a second embodiment;

FIG. 7 shows a view onto the section plane A-A in FIG. 6;

FIG. 8 shows a view onto the section plane B-B in FIG. 6;

FIG. 9 shows an enlarged illustration of the detail C in FIG. 6; and

FIG. 10 shows an enlarged illustration of the detail D in FIG. 6.

DETAILED DESCRIPTION

The schematic lateral view of FIG. 1 shows a screw 10 according to the invention and according to a first embodiment which has a shank 12 and a screw head 14. The screw head 14 is provided with a drive configuration which in the embodiment illustrated is configured as an external hexagon.

The screw 10 is configured as a cutting screw or as a screw for cutting a thread into a component. In the cutting of a thread, a core bore is first produced in the component. The production of the core bore can be performed in various ways, for example by means of boring, punching, laser cutting, or in the primary forming of the component, in particular in casting. The core bore can moreover be produced by the screw tip per se. The screw 10 in this instance forms a thread in the component while being driven into the latter. The core bore produced in the component therefore does not have to first be provided with a thread in a separate operating step. Nevertheless, the screw 10 can also be driven back out of the thread that has been cut by said screw 10. Special screws which by means of plastic deformation also form a core bore in the component per se are known. Such screws are referred to as flow drilling screws and typically have a smooth and rounded tip which then initially produces a passage or an opening in a component. The smooth tip is then followed by a cutting portion and a holding portion of the screw. The present invention can also be applied to such flow drilling screws.

The screw 10 at that end thereof that is opposite the screw head 14 first has an attachment portion 16 which is configured so as to be truncated-cone-shaped. A calibration portion 18 which is configured so as to be cylindrical follows the attachment portion 16. The attachment portion 16 and the calibration portion 18 conjointly form a cutting portion 20 by way of which a thread can be cut into an existing bore. An intermediate portion 32 which is configured so as to be truncated-cone-shaped adjoins the cutting portion 20. The intermediate portion 32 is then followed by a holding portion 24 which is configured so as to be cylindrical and has a larger external diameter in relation to the cutting portion 20. The intermediate portion 32 thus serves for producing a transition between the cutting portion 20 having a comparatively small external diameter and the holding portion 24 having a comparatively large external diameter.

A view onto the section plane A-A in FIG. 1 is illustrated in FIG. 2. It can be seen that the screw 10 in the cutting portion 20 has a trilobular cross section. A cross section which has three rounded corners and three convexly curved lateral edges is referred to as a trilobular cross section. An external diameter of the polylobular or polygonal cross section is defined by a circumcircle having a diameter D1 about the cross section.

The section plane A-A runs through the calibration portion 18 of the cutting portion 20. The cutting portion 20 also has a trilobular cross section in the attachment portion 16. The trilobular cross section facilitates the cutting of the thread.

The illustration of FIG. 3 shows a view onto the section plane B-B in FIG. 1. It can be seen that the holding portion has a circular cross section having an external diameter D2. D2 is larger than D1 and, as has already been discussed, the intermediate portion 32 is configured so as to be truncated-cone-shaped so as to form a transition from the cutting portion 20 having the comparatively small external diameter D1 to the holding portion 24 having the comparatively large external diameter D2.

The illustration of FIG. 4 shows the enlarged detail C from FIG. 1. It can be seen that the holding portion 24 has thread flanks 26, wherein a transition between mutually neighboring thread flanks 26 is configured so as to be rounded. The thread flanks 26 at the outward end in the radial direction have a width B2.

The illustration of FIG. 5 shows the detail D from FIG. 1. As can be seen, the cutting portion 20, illustrated here in the region of the calibration portion 18, has a transition between the individual thread flanks 28 that is configured so as to be V-shaped. On account of the V-shaped transition between the individual thread flanks 28 in the cutting portion 20, it is achieved that a base of the thread flanks 28, thus a width of the thread flanks 28 at the height of the tip of the V-type transition, measured from top to bottom in FIG. 5, thus in the longitudinal direction of the shank, is larger than the corresponding width of the base of the thread flanks 26 in the holding portion 24.

The thread flanks 28 in the cutting portion 20 at the radially outward end have a width B1. Said width B1 is larger than the width B2 of the thread flanks 26 in the holding portion 24.

On account thereof, the thread flanks 28 in the cutting portion 20 are configured so as to be more stable than the thread flanks 26 in the holding portion 24, and on account thereof are particularly suitable for cutting a thread. By contrast, the thread flanks 26 that are configured so as to be narrower in the holding portion 24 contribute to a very well adapted engagement of the thread flanks 26 in the thread that is cut into the component. On account thereof, an improved engagement of the holding portion 24, and on account thereof an increased loading capacity of the screw 10, in relation to conventional thread-cutting screws is achieved.

The illustration of FIG. 6 shows a further embodiment of a screw 30 according to the invention for cutting a thread. The screw 30 differs from the screw of FIG. 1 only in terms of the design of the cutting portion 22 of said screw 30. Apart from the cutting portion 22, the screw 30 is configured in a manner identical to the screw 10 of FIGS. 1 to 5. Therefore, only the features of the screw 30 which differ will be explained hereunder.

The cutting portion 22 across the entire length thereof is configured so as to be truncated-cone-shaped. By contrast, the holding portion 24 is configured so as to be cylindrical. Also with the screw 30, the cutting portion 22 has a smaller external diameter in relation to the holding portion 24.

The illustration of FIG. 7 shows a view onto the section plane A-A in FIG. 6. It can be seen that the cutting portion 22 has a circular cross section having a diameter D1.

FIG. 8 shows a view onto the section plane B-B in FIG. 6. It can be seen that the holding portion 24 has a circular cross section having an external diameter D2. As has been discussed, the external diameter D2 in the holding portion 24 is larger than the external diameter D1 in the cutting portion 22. It is to be stated herein that the external diameter D1 of the cutting portion 22, by virtue of the truncated-cone-shaped design thereof, slowly ascends until said external diameter D1 at the transition toward the holding portion 24 inevitably achieves the dimension of the diameter D2 of the holding portion 24. With the exception of said last transition which can also be referred to as an intermediate portion, the external diameter D1 in the cutting portion 22 is however smaller than the external diameter D2 in the holding portion 24.

The illustration of FIG. 9 shows an enlarged illustration of the detail C in FIG. 6. It can be seen that the holding portion 24 of the screw 30 is configured in the same way as the holding portion 24 of the screw 10 of FIG. 1.

The illustration of FIG. 10 shows the detail D from FIG. 6 in an enlarged manner. It can also be seen here that the cutting portion 22 in terms of the design of the thread flanks 28 thereof is configured in a manner identical to the cutting portion 20 of the screw 10 of FIG. 1. The difference between the screws 10 and 30 thus lies exclusively in the design of the cutting portion 22, specifically as a truncated-cone-shaped portion having a circular cross section.

The invention claimed is:

1. A screw for cutting a thread into a component, comprising:
 a shank which at least in portions is provided with a thread,
 a screw head having a drive configuration, the screw head being adjoined by the shank,
 wherein, proceeding from an end of the shank that is opposite the head, first a cutting portion and then a holding portion are disposed, wherein the cutting portion and the holding portion are provided with a thread,
 wherein the holding portion has a larger external diameter in relation to the cutting portion,
 further including a truncated-cone-type intermediate portion that is provided with a thread is disposed between the holding portion and the cutting portion, and wherein the cutting portion has a truncated-cone-type attachment portion, and
 further wherein the holding portion has a circular cross section, in that the cutting portion has a polygonal cross section having rounded corners and convexly curved lateral edges, in particular a polylobular cross section, in that a core diameter of the thread in the holding portion conforms to a core diameter according to a standard suitable for the intended application, in particular according to ISO-965 and/or DIN 13-20, in that the external diameter of the thread in the holding portion is enlarged by a maximum of 4%, in particular by a maximum of 1%, in relation to an external diameter according to a standard suitable for the intended application, in particular according to ISO-965 and/or DIN 13-20.

2. The screw as claimed in claim 1, wherein a height of the thread flanks, measured in the radial direction, in the holding portion is larger than in the cutting portion.

3. The screw as claimed in claim 1, wherein the holding portion is configured so as to be cylindrical.

4. The screw as claimed in claim 1, wherein the cutting portion has a cylindrical calibration portion.

5. The screw as claimed in claim 1, wherein the cutting portion overall is configured in the manner of a truncated cone.

6. The screw as claimed in claim 1, wherein the cutting portion has a shape that tapers off toward the tip, the envelope lines of said shape being curved.

7. The screw as claimed in claim 6, characterized in that the envelope lines run so as to be parabolic.

8. The screw as claimed in claim 6, wherein the envelope lines terminate at a flattened tip.

9. The screw as claimed in claim 1, wherein the holding portion has a circular cross section, the cutting portion has a polygonal cross section having rounded corners and convexly curved lateral edges, and a cross-sectional variation from polygonal to circular is performed in the intermediate portion.

10. The screw as claimed in claim 9, wherein the last thread turn of the intermediate portion at the transition from the intermediate portion to the holding portion has a circular cross section.

11. The screw as claimed in claim 1, wherein the length of the intermediate portion is between double and triple the thread pitch of the thread.

12. The screw as claimed in claim 1, characterized in that the first thread turn of the attachment portion at the end of the screw has a circular cross section.

13. The screw as claimed in claim 1, wherein a core diameter of the thread in the holding portion conforms to a core diameter according to a standard suitable for the intended application, in particular according to at least one of ISO-965 and DIN 13-20.

* * * * *